(12) United States Patent
Engle et al.

(10) Patent No.: US 11,462,019 B2
(45) Date of Patent: Oct. 4, 2022

(54) PREDICTING RIDER ENTRY TIME FOR PICK-UP AND DROP-OFF LOCATIONS

(71) Applicant: GM CRUISE HOLDINGS LLC, San Francisco, CA (US)

(72) Inventors: Stephanie Olivia Engle, San Francisco, CA (US); Soleil Phan, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 301 days.

(21) Appl. No.: 16/577,273

(22) Filed: Sep. 20, 2019

(65) Prior Publication Data

US 2021/0089788 A1 Mar. 25, 2021

(51) Int. Cl.

| | | |
|---|---|---|
| *G05D 1/00* | (2006.01) | |
| *G06V 20/56* | (2022.01) | |
| *B60W 40/08* | (2012.01) | |
| *G08G 1/00* | (2006.01) | |
| *G08G 1/0967* | (2006.01) | |
| *G08G 1/01* | (2006.01) | |

(52) U.S. Cl.
CPC ............. *G06V 20/56* (2022.01); *B60W 40/08* (2013.01); *G05D 1/0088* (2013.01); *G08G 1/0137* (2013.01); *G08G 1/096791* (2013.01); *G08G 1/205* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,599,477 B1 * | 3/2017 | Aula | G06K 9/00805 |
| 10,532,749 B2 * | 1/2020 | Donnelly | G06F 3/04842 |
| 2017/0343375 A1 * | 11/2017 | Kamhi | G01C 21/3407 |
| 2017/0344010 A1 * | 11/2017 | Rander | G05D 1/0217 |
| 2019/0066515 A1 * | 2/2019 | Dyer | G01C 21/3438 |
| 2019/0332123 A1 * | 10/2019 | Donnelly | B60R 25/24 |

* cited by examiner

*Primary Examiner* — Sze-Hon Kong
*Assistant Examiner* — Davin Seol
(74) *Attorney, Agent, or Firm* — Polsinelli, PC (57) ABSTRACT

An autonomous vehicle having observational sensors and a computing system. The computing system may have a processor and memory having computer-executable instructions that may cause the processor to determine, based upon a profile of a user, an average amount of time it takes the user to enter or exit the autonomous vehicle. The processor may then cause the observational sensors to detect and observe obstacles around the locations. The processor may also determined, based upon detected objects around the autonomous vehicle and the average amount of time it takes the user to enter or exit the autonomous vehicle, a location to stop to allow the user to enter or exit the autonomous vehicle.

20 Claims, 7 Drawing Sheets

PREDICTING RIDER ENTRY TIME FOR PICK-UP AND DROP-OFF LOCATIONS

TECHNICAL FIELD

The present technology relates to predicting rider entry and exit time from an autonomous vehicle and more particularly to determining pick-up and drop-off locations that correlate to the rider entry and exit times.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle stops to pick up and/or drop off riders, the vehicle may become a hazard and/or cause traffic for other vehicles on the road. Human drivers use their judgment to assess whether a pick-up or drop-off location is suitable given the traffic conditions. A human driver may also communicate with a passenger to agree on a safe pick-up or drop-off location.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for an autonomous vehicle that can determine safe and efficient pick-up and drop-off locations for passengers of the autonomous vehicle.

In general, ridesharing causes new problems, in that picking up and dropping off passengers of the rideshare vehicle often creates congestion and traffic near pick-up and drop-off locations. Because the autonomous vehicles lack a human driver for the passenger to interact with, the pick-up and drop-off routines or procedures may exacerbate congestion and traffic more than typical vehicles with human drivers around these locations. For example, the passenger can easily and directly communicate with the human driver to find an agreeable location for the passenger to enter or exit the vehicle. However, it is challenging for the autonomous vehicle to determine a location, to which the passenger may accept or reject.

Furthermore, there are challenges in the duration for which the vehicle may allow the passenger to enter or exit the vehicle. For a human driver, the solution is simply to communicate with the passenger. However, for an autonomous vehicle, the challenge is far more complex due to the reduced interaction and communication with the passenger.

Accordingly, there is a need for a solution that will allow an autonomous vehicle to determine and match the amount of time a rider takes to enter and/or exit the autonomous vehicle with a location that provides enough time for the rider to safely enter and/or exit the autonomous vehicle.

Figure 1:
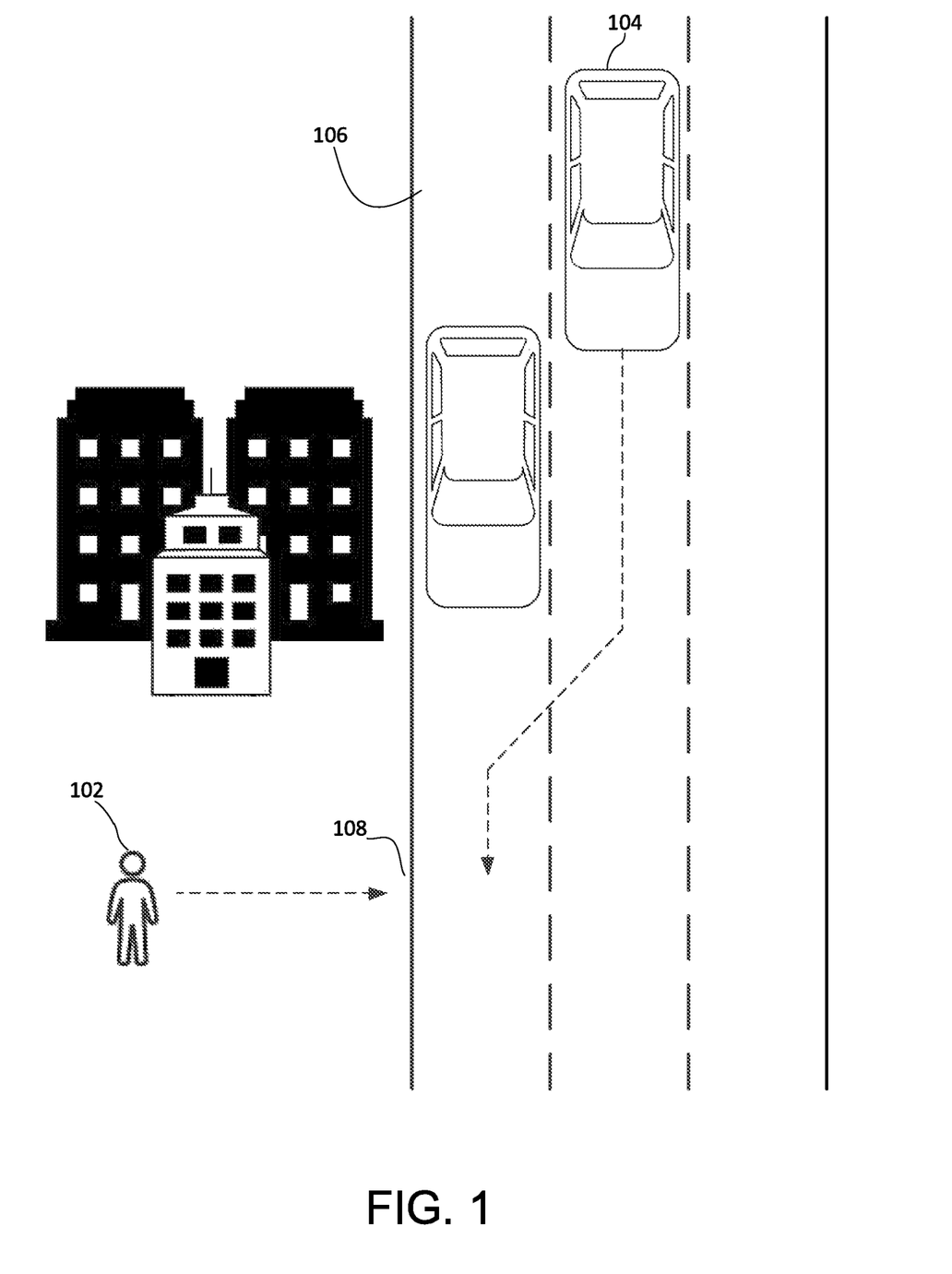
FIG. 1 shows an example environment having an autonomous vehicle finding a pick-up location near a user in accordance with some aspects of the present technology.

FIG. 1 illustrates an example environment in which an autonomous vehicle 104 arrives to pick up a passenger 102. More specifically, the autonomous vehicle 104 determines and observes potential pick-up locations 106 and determines a designated pick-up location 108, where the passenger 102 is to meet the autonomous vehicle 104 for pick-up.

Figure 2:
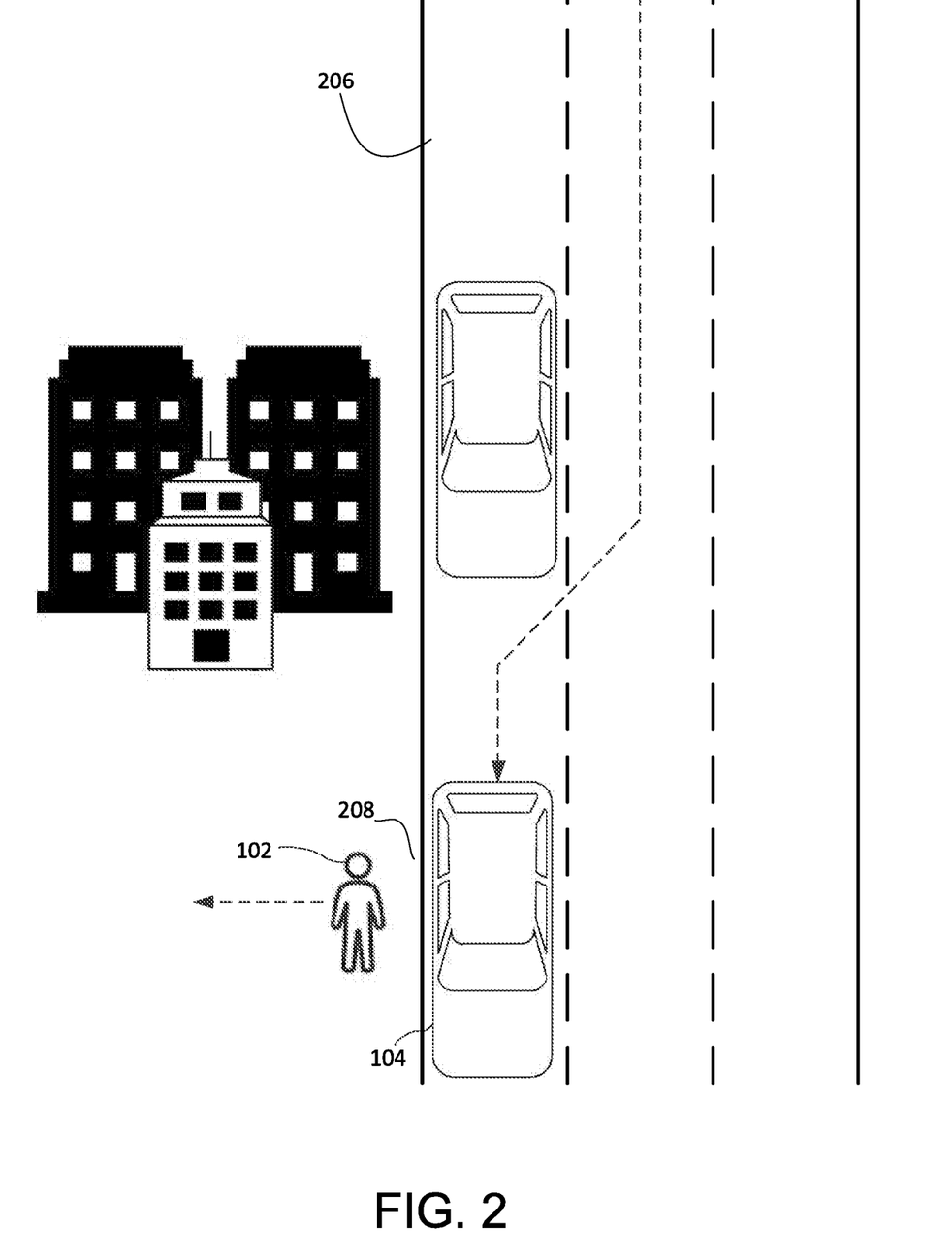
FIG. 2 shows an example environment having an autonomous vehicle finding a drop-off location for a user in accordance with some aspects of the present technology.

FIG. 2 illustrates an exemplary environment in which the autonomous vehicle 104 arrives at a destination to drop-off the passenger 102. More specifically, the autonomous vehicle 104 determines and observes potential drop-off locations 206 and determines a designated drop-off location 208, where the passenger is to exit the autonomous vehicle 104.

Figure 3:
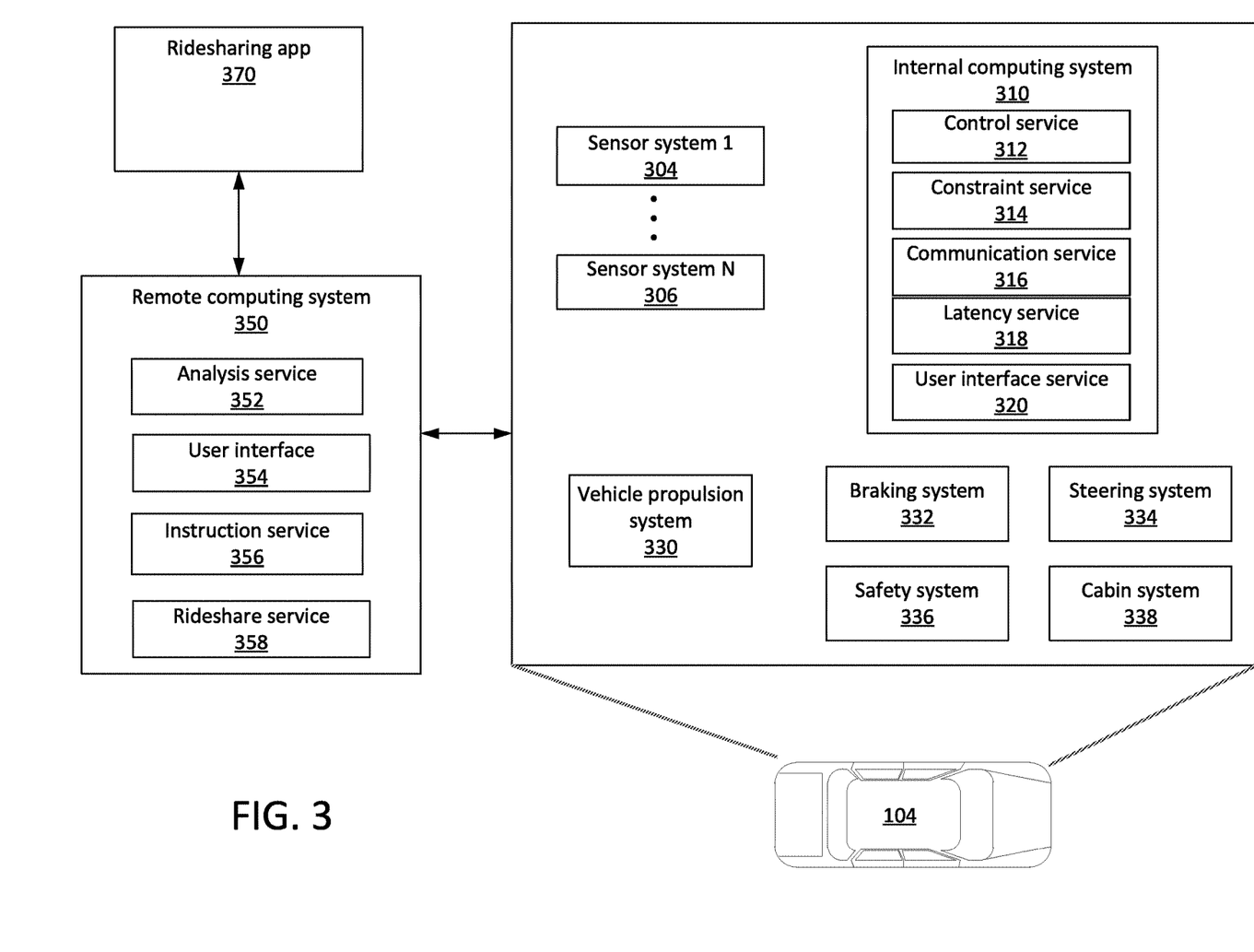
FIG. 3 shows an example of an example system for operating an autonomous vehicle in accordance with some aspects of the present technology.

FIG. 3 illustrates an environment that includes the autonomous vehicle 104 in communication with a remote computing system 350.

The autonomous vehicle 104 can navigate about roadways without a human driver based upon sensor signals output by sensor systems 304-306 of the autonomous vehicle 104. The autonomous vehicle 104 includes a plurality of sensor systems 304-306 (a first sensor system 304 through an Nth sensor system 306). The sensor systems 304-306 are of different types and are arranged about the autonomous vehicle 104. For example, the first sensor system 304 may be a camera sensor system, and the Nth sensor system 306 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 104 further includes several mechanical systems that are used to effectuate appropriate motion of the autonomous vehicle 104. For instance, the mechanical systems can include but are not limited to, a vehicle propulsion system 330, a braking system 332, and a steering system 334. The vehicle propulsion system 330 may include an electric motor, an internal combustion engine, or both. The braking system 332 can include an engine brake, brake pads, actuators, and/or any other suitable componentry that is configured to assist in decelerating the autonomous vehicle 104. The steering system 334 includes suitable componentry that is configured to control the direction of movement of the autonomous vehicle 104 during navigation.

The autonomous vehicle 104 further includes a safety system 336 that can include various lights and signal indicators, parking brake, airbags, etc. The autonomous vehicle 104 further includes a cabin system 338 that can include cabin temperature control systems, in-cabin entertainment systems, etc.

The autonomous vehicle 104 additionally comprises an internal computing system 310 that is in communication with the sensor systems 304-306 and the systems 330, 332, 334, 336, and 338. The internal computing system includes at least one processor and at least one memory having computer-executable instructions that are executed by the processor. The computer-executable instructions can make up one or more services responsible for controlling the autonomous vehicle 104, communicating with remote computing system 350, receiving inputs from passengers or human co-pilots, logging metrics regarding data collected by sensor systems 304-306 and human co-pilots, etc.

The internal computing system 310 can include a control service 312 that is configured to control the operation of the vehicle propulsion system 330, the braking system 332, the steering system 334, the safety system 336, and the cabin system 338. The control service 312 receives sensor signals from the sensor systems 304-306 as well communicates with other services of the internal computing system 310 to effectuate operation of the autonomous vehicle 104. In some embodiments, control service 312 may carry out operations in concert one or more other systems of autonomous vehicle 104.

The internal computing system 310 can also include a constraint service 314 to facilitate safe propulsion of the autonomous vehicle 104. The constraint service 316 includes instructions for activating a constraint based on a rule-based restriction upon operation of the autonomous vehicle 104. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 312.

The internal computing system 310 can also include a communication service 316. The communication service can include both software and hardware elements for transmitting and receiving signals from/to the remote computing system 350. The communication service 316 is configured to transmit information wirelessly over a network, for example, through an antenna array that provides personal cellular (long-term evolution (LTE), 3G, 5G, etc.) communication.

In some embodiments, one or more services of the internal computing system 310 are configured to send and receive communications to remote computing system 350 for such reasons as reporting data for training and evaluating machine learning algorithms, requesting assistance from remoting computing system or a human operator via remote computing system 350, software service updates, ridesharing pick-up and drop off instructions etc.

The internal computing system 310 can also include a latency service 318. The latency service 318 can utilize timestamps on communications to and from the remote computing system 350 to determine if a communication has been received from the remote computing system 350 in time to be useful. For example, when a service of the internal computing system 310 requests feedback from remote computing system 350 on a time-sensitive process, the latency service 318 can determine if a response was timely received from remote computing system 350 as information can quickly become too stale to be actionable. When the latency service 318 determines that a response has not been received within a threshold, the latency service 318 can enable other systems of autonomous vehicle 104 or a passenger to make necessary decisions or to provide the needed feedback.

The internal computing system 310 can also include a user interface service 320 that can communicate with cabin system 338 in order to provide information or receive information to a human co-pilot or human passenger. In some embodiments, a human co-pilot or human passenger may be required to evaluate and override a constraint from constraint service 314, or the human co-pilot or human passenger may wish to provide an instruction to the autonomous vehicle 104 regarding destinations, requested routes, or other requested operations.

As described above, the remote computing system 350 is configured to send/receive a signal from the autonomous vehicle 140 regarding reporting data for training and evaluating machine learning algorithms, requesting assistance from remote computing system 350 or a human operator via the remote computing system 350, software service updates, rideshare pick-up and drop off instructions, etc.

The remote computing system 350 includes an analysis service 352 that is configured to receive data from autonomous vehicle 104 and analyze the data to train or evaluate machine learning algorithms for operating the autonomous vehicle 104. The analysis service 352 can also perform analysis pertaining to data associated with one or more errors or constraints reported by autonomous vehicle 104.

The remote computing system 350 can also include a user interface service 354 configured to present metrics, video, pictures, sounds reported from the autonomous vehicle 104 to an operator of remote computing system 350. User interface service 354 can further receive input instructions from an operator that can be sent to the autonomous vehicle 104.

The remote computing system 350 can also include an instruction service 356 for sending instructions regarding the operation of the autonomous vehicle 104. For example, in response to an output of the analysis service 352 or user interface service 354, instructions service 356 can prepare instructions to one or more services of the autonomous vehicle 104 or a co-pilot or passenger of the autonomous vehicle 104.

The remote computing system 350 can also include a rideshare service 358 configured to interact with ridesharing application 370 operating on (potential) passenger computing devices. The rideshare service 358 can receive requests to be picked up or dropped off from passenger ridesharing app 370 and can dispatch autonomous vehicle 104 for the trip. The rideshare service 358 can also act as an intermediary between the ridesharing app 370 and the autonomous vehicle wherein a passenger might provide instructions to the autonomous vehicle 104 to go around an obstacle, change routes, honk the horn, etc.

Figure 4:
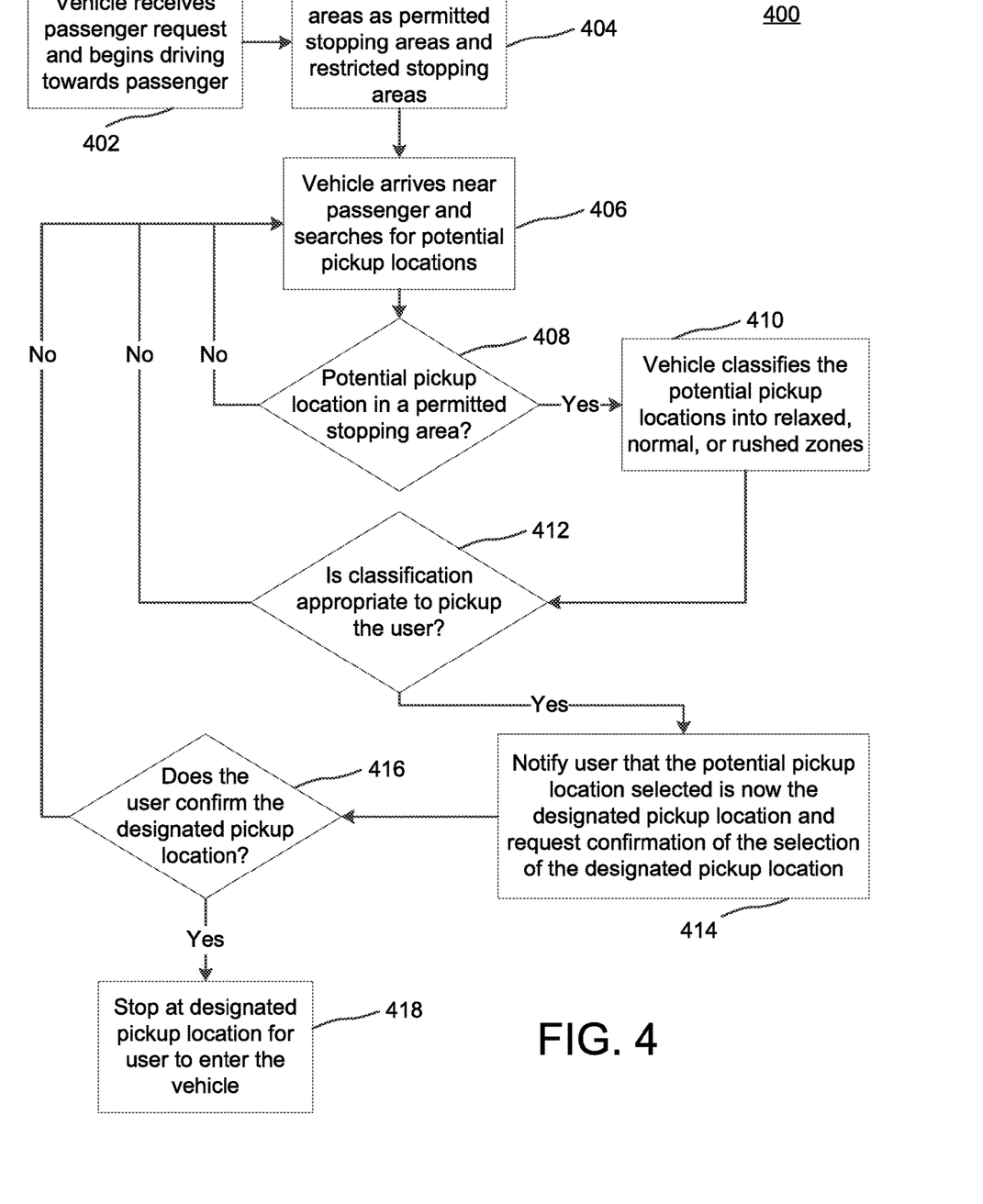
FIG. 4 is a flow diagram that illustrates an example pick-up location determination procedure in accordance with some aspects of the present technology.

FIG. 4 illustrates a flow diagram for a pick-up location determination procedure 400 that the autonomous vehicle 104 may perform to determine and optimize the designated pick-up location 108.

The pick-up location determination procedure 400 begins at step 402, when the autonomous vehicle 104 receives a request for ridesharing from the passenger 102 through the remote computing system 350. The autonomous vehicle 104 then begins driving towards the general vicinity of a location the passenger 102 requests. In most cases, the location the passenger 102 requests is near the passenger 102; however, it is contemplated that the passenger 102 may request the autonomous vehicle 104 to arrive at a specific location that is different from the current location of passenger 102.

At step 404, the autonomous vehicle 104 determines areas as areas that permit stopping and areas that restrict stopping. This may be accomplished by accessing a map database having characteristics for each area. These characteristics may be long-term characteristics or short-term characteristics. An example for a long-term characteristics may be a specified zone that only allows stopping during certain hours of the day or a construction zone that restricts stopping for a few weeks. An example for a short-term characteristic may be other vehicles or obstacles temporarily occupying the area or a traffic guard turning vehicles away from the area. In some embodiments, the autonomous vehicle 104 may use the sensor systems 304-306 to observe signs and/or communicate with the remote computing system 350 and/or other autonomous vehicles 104 of an autonomous vehicle fleet to receive data and, from interpreting the data, determine whether areas permit or restrict stopping.

At step 406, the autonomous vehicle 104 arrives in a general vicinity of the location the passenger 102 requests. In some embodiments, the autonomous vehicle 104 arrives within a predetermined distance from the requested location, which may be measured by an absolute distance, a travel distance, or the like. The autonomous vehicle 104 can utilize the sensor systems 304-306 to search for and determine the potential pick-up locations 106. In one or more embodiments, the potential pick-up locations 106 are based on data from the map database, which may include locations of predetermined areas designated as potential pick-up locations. More specifically, the autonomous vehicle 104 uses the sensor system 304-306 to detect and observe open spaces, traffic signs, and other objects to determine whether the potential pick-up locations 106 are available for the autonomous vehicle 104 to use (e.g. not blocked by other vehicles, construction, traffic restrictions, etc.).

At step 408, the autonomous vehicle 104 determines in real time based on the sensor systems 304-306 whether the identified potential pick-up locations 106 are within a permitted stopping area. In other words, the autonomous vehicle 104 verifies that the permitted stopping area is free from signs, cones, and/or any other signals that may change a typically permitted stopping area into a restricted stopping area. For example, the autonomous vehicle 104 may have determined, based on data from the map database in step 404, that a particular area having the potential pick-up location 106 permits stopping; however, based on real-time data, determines that the potential pick-up location 106 is actually a restricted stopping area. This update to the map data may be transmitted to other autonomous vehicles via the remote computing system 350.

If the potential pick-up location 106 is not in a permitted stopping area, the autonomous vehicle 104 returns to step 406 to search for more potential pick-up locations 106. If the potential pick-up location 106 is in a permitted stopping area, the procedure continues to step 410. It is further contemplated that the autonomous vehicle 104 may identify and process multiple potential pick-up locations 106 concurrently, such as in a multithreaded process.

In step 410, the autonomous vehicle 104 classifies the potential pick-up location 106 based on a perceived amount of time it would take to complete a pick-up. For example, the autonomous vehicle 104 may classify the potential pick-up locations 106 into a relaxed, normal or rushed zone. In general, the classification would depend on environmental factors. The classification of the zones may be based upon objects, open spaces, traffic signs, etc. observed by the sensor systems 304-306 and/or live traffic data from other autonomous vehicles 104 of the autonomous vehicle fleet. Similarly, classification of the zones may be based upon other characteristics or categorizations of the location (e.g. the location is a grocery store).

The relaxed zones are generally zones that have a longer than average amount of time for picking up passengers 102. For example, the autonomous vehicle 104 may observe a turn-out location specifically designed for passenger pick-up or loading and accordingly classify the zone as a relaxed zone. As another example, the autonomous vehicle 104 may observe an area, determine that there is a relatively lower density of traffic, and accordingly classify the area as a relaxed zone. The normal zone may be a zone that has an average amount of time for picking up passengers 102. For example, the autonomous vehicle 104 may observe a typical street, determine that there is an average density of traffic, and accordingly classify the street as a normal zone. The rushed zone may be a zone that has a shorter than average amount of time for picking up passengers 102. For example, the autonomous vehicle 104 may observe a busy street, determine that there is a relatively higher density of traffic, and accordingly classify the busy street as a rushed zone. In one or more embodiments, the remote computing system 350 maintains a history of the amounts of time for picking up passengers at various pick-up locations. For example, the autonomous vehicle 104 determines a length of time between parking in a pick-up location and leaving the pick-up location after successfully picking up a passenger, and transmits the length of time to the remote computing system 350 for one or more pick-ups. As another consideration, the autonomous vehicle 104 may additionally or alternatively classify zones based on ease of boarding. More specifically, the autonomous vehicle 104 may detect that a zone may have obstacles, objects, and/or other hazards that may affect the amount of time required for the passenger 102 to board the autonomous vehicle 104. For example, a zone may have a high curb that slows passengers 102 from entering the autonomous vehicle 104. The autonomous vehicle 104 may then classify this zone as a rushed zone and a difficult zone, having a short amount of time relative to the difficulties to entering the autonomous vehicle 104.

At step 412, the autonomous vehicle 104 determines whether the classification of the zone is appropriate for picking up the passenger 102. In determining whether the classification of the zone is appropriate, the autonomous vehicle may consider a wide variety of factors, including, but not limited to objects in the road, speed of objects, whether there is a parking space available, whether there is a need to double park, whether an amount of time offered by the respective zone is enough for the passenger 102 to board or enter the autonomous vehicle 104, etc. In determining whether the amount of time offered by the respective zone is enough, the autonomous vehicle 104 may first determine the amount of time required for the passenger 102 to board or enter the autonomous vehicle 104 and compare the respective amounts of time.

In determining the amount of time required for the passenger 102 to board or enter the autonomous vehicle 104, the autonomous vehicle 104 may consider a wide variety of factors including, but not limited to, an average amount of time required for the passenger 102 to board an autonomous vehicle, preferences of the passenger 102, a classification of the pick-up location retrieved from a map and/or a remote computing system 350 (e.g. a map database on the remote computing system 350 indicates that the pick-up location is by a grocery store; therefore, the autonomous vehicle 104 should allocate more time for the passenger 102 to board because the passenger 102 may presumably be loading groceries into the autonomous vehicle 104), number of passengers 102, etc. Moreover, the autonomous vehicle 104 may further determine a projected amount of time for the passenger 102 to close a distance between a current location of the passenger 102 and the potential pick-up location 106 based upon a wide variety of factors, including but not limited to, an average speed of the passenger 102, the distance between a position of the passenger 102 and the potential pick-up location 106, information stored in the profile of the passenger 102, etc. The autonomous vehicle 104 may then add the projected amount of time to the amount of time required for the passenger 102 to enter the autonomous vehicle 104 to calculate an estimated total amount of time for the passenger 102 to arrive at and board the autonomous vehicle 104. In other words, the estimated total amount of time for the passenger 102 to arrive at and board the autonomous vehicle 104 may be substantially similar to a total amount of time for the autonomous vehicle 104 to arrive at the potential pick-up location 106 in addition to an amount of time the autonomous vehicle 104 is stationary for the passenger 102 to board the autonomous vehicle 104.

Thus, the autonomous vehicle 104 also measures the amount of time required for the passenger 102 to board or enter the autonomous vehicle 104 against the classification of the potential pick-up location 106, such that if the amount of time offered by the classification of the potential pick-up location equates or exceeds the amount of time required for the passenger 102 to board or enter the autonomous vehicle 104 then the autonomous vehicle 104 determines that there is enough time for the passenger 102 to be picked up. Consequently, the pick-up location determination procedure proceeds to step 414.

If the amount of time offered by the classification of the potential pick-up location does not equate or exceed the amount of time required for the passenger 102 to board or enter the autonomous vehicle 104, then the autonomous vehicle 104 determines that there is not enough time for the passenger 102 to be picked up and returns to step 406 to search for other potential pick-up locations 106.

It is understood that determining the amount of time required for the passenger 102 to board the autonomous vehicle 104 may occur at many different points in time for the pick-up location determination procedure 400. For example, determining the amount of time required for the passenger 102 to board the autonomous vehicle 104 may occur prior to step 402, 404, 406, 408, and/or 410.

At step 414, the autonomous vehicle 104 has identified potential pick-up location 106 as having an appropriately classified zone to pick up the passenger 102. Thus, the autonomous vehicle 104 selects the potential pick-up location 106 as the designated pick-up location 108. Furthermore, the autonomous vehicle 104 notifies the passenger 102 of the designated pick-up location 108. The autonomous vehicle 104 may then be configured to request and receive confirmation of the selection of the designated pick-up location 108.

It is further contemplated that the autonomous vehicle 104 may also notify the passenger 102 of the classification of the zone of the designated pick-up location 108. For example, the autonomous vehicle 104 may select a rushed zone, which would have a shorter than average amount of time for the passenger 102 to board the vehicle. Thus, the passenger 102 must board the autonomous vehicle 104 more quickly. While some passengers 102 may have no problem quickly boarding, other passengers 102 may only want to board quickly when they have prior notice. Similarly, some passengers 102 may hasten their boarding when they are notified of the classification of the designated pick-up location 108 as a rushed zone.

At step 416, the autonomous vehicle 104 receives a transmission from the passenger 102. The transmission may confirm selection of the designated pick-up location 108. The transmission may accept or reject the designated pick-up location 108. If the passenger 102 rejects the designated pick-up location 108, the autonomous vehicle 104 receives the transmission and returns to step 406 to search for other potential pick-up locations. For example, the autonomous vehicle 104 may have selected a rushed zone for the designated pick-up location 108, but the passenger 102 may want to have a relaxed or slower boarding pace. Thus, the passenger 102 may reject and/or deny confirmation of the designated pick-up location 108. If the passenger 102 accepts or confirms the designated pick-up location 108, the autonomous vehicle 104 receives the transmission and continues to step 418.

At step 418, the autonomous vehicle 104 arrives at the designated pick-up location 108 so that the passenger may enter the autonomous vehicle 104.

Figure 5:
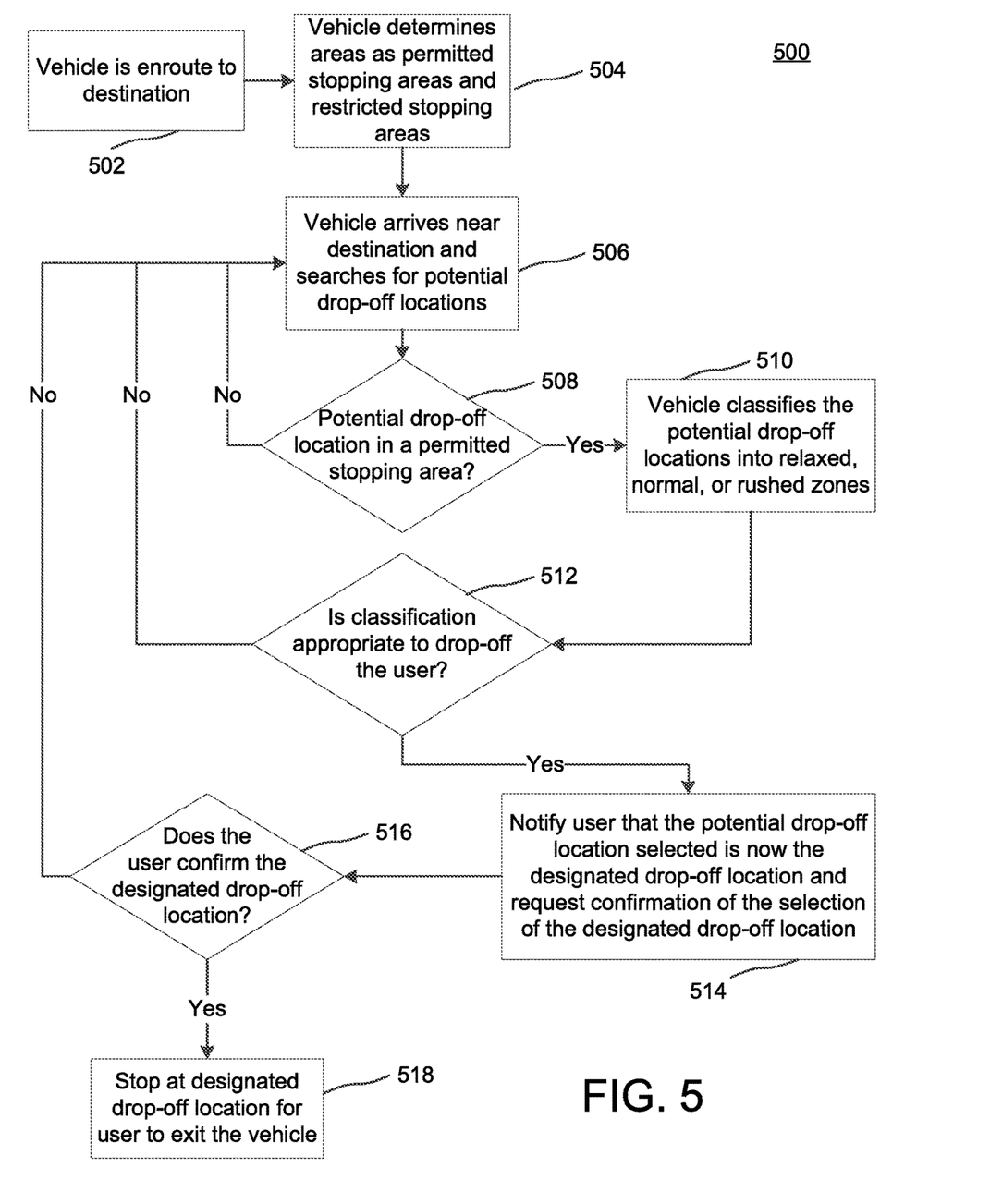
FIG. 5 is a flow diagram that illustrates an example drop-off location determination procedure in accordance with some aspects of the present technology.

FIG. 5 illustrates a flow diagram for a drop-off location determination procedure 500 that the autonomous vehicle 104 may perform to determine and optimize the designated drop-off location 208.

The drop-off location determination procedure 500 begins at step 502, when the autonomous vehicle 104 is in a ridesharing journey requested by the passenger 102 through the remote computing system 350. In other words, the autonomous vehicle 104 is moving with the passenger 102 towards a general vicinity of a location the passenger 102 requests.

At step 504, the autonomous vehicle 104 determines areas as areas that permit stopping and areas that restrict stopping. This may be accomplished by accessing a map database having characteristics for each area. These characteristics may be long-term characteristics or short-term characteristics. An example for a long-term characteristics may be a specified zone that only allows stopping during certain hours of the day or a construction zone that restricts stopping for a few weeks. An example for a short-term characteristic may be other vehicles or obstacles temporarily occupying the area or a traffic guard turning vehicles away from the area. In some embodiments, the autonomous vehicle 104 may use the sensor systems 304-306 to observe signs and/or communicate with the remote computing system 350 and/or other autonomous vehicles 104 of an autonomous vehicle fleet to receive data and, from interpreting the data, determine whether areas permit or restrict stopping.

At step 506, the autonomous vehicle 104 arrives in the general vicinity of the location the passenger 102 requests. In some embodiments, the autonomous vehicle 104 arrives within a predetermined distance from the requested location, which may be measured by an absolute distance, a travel distance, or the like. The autonomous vehicle 104 can utilize the sensor systems 304-306 to search for and determine the potential drop-off locations 206. In one or more embodiments, the potential drop-off locations 206 are based on data from the map database, which may include locations of predetermined areas designated as potential drop-off locations. More specifically, the autonomous vehicle 104 uses the sensor system 304-306 to detect and observe open spaces, traffic signs, and other objects to determine whether the potential drop-off locations 206 are available for the autonomous vehicle 104 to use (e.g. not blocked by other vehicles, construction, traffic restrictions, etc.).

At step 508, the autonomous vehicle 104 determines in real time based on data interpreted from the sensor system 304-306 whether the identified potential drop-off locations 206 are within a permitted stopping area. In other words, the autonomous vehicle 104 verifies that the permitted stopping area is free from signs, cones, and/or any other signals that may change a typically permitted stopping area into a restricted stopping area. For example, the autonomous vehicle 104 may have determined, based on data from the map database in step 504, that a particular area having the potential drop-off location permits stopping; however, based on real-time data, determines that the potential drop-off location is actually a restricted stopping area. This update to the map data may be transmitted to other autonomous vehicles via the remote computing system 350.

If the potential drop-off location 206 is not in a permitted stopping area, the autonomous vehicle 104 returns to step 506 to search for more potential drop-off locations 206. If the potential drop-off location 206 is in a permitted stopping area, the procedure continues to step 510. It is further contemplated that the autonomous vehicle 104 may identify and process multiple potential drop-off locations 206 concurrently, such as in a multithreaded process.

In step 510, the autonomous vehicle 104 classifies the potential drop-off location 206 based on a perceived amount of time it would take to complete a drop-off. For example, the autonomous vehicle 104 may classify the potential drop-off locations 206 into a relaxed, normal or rushed zone. In general, the classifications would depend on environmental factors. Again, the classification of the zones may be based upon objects, open spaces, traffic signs, etc. observed by the sensor systems 304-306 and/or live traffic data indicating current traffic conditions from other autonomous vehicles 104 of the autonomous vehicle fleet. Similarly, classification of the zones may be based upon other characteristics or categorizations of the location of both the designated drop-off location 208 and the drop-off location (e.g. the designated drop-off location 208 is a grocery store and the drop-off location is a residential area).

As discussed above, the relaxed zones are generally zones that have a longer than average amount of time for picking up passengers 102. For example, the autonomous vehicle 104 may detect a turn-out location specifically designed for passenger drop-off or unloading and accordingly classify the zone as a relaxed zone. In one or more embodiments, the remote computing system 350 maintains a history of the amounts of time for dropping off passengers at various drop-off locations. For example, the autonomous vehicle 104 determines a length of time between parking in a drop-off location and leaving the drop-off location after successfully dropping off a passenger, and transmits the length of time to the remote computing system 350 for one or more drop-offs. In some embodiments, the autonomous vehicle 104 may classify zones based on ease of exiting. More specifically, the autonomous vehicle 104 may detect obstacles, objects, and/or other hazards in the zone that may affect the amount of time required for the passenger 102 to exit the autonomous vehicle 104. For example, a zone may have a high curb that slows passengers 102 from exiting the autonomous vehicle 104. The autonomous vehicle 104 may then classify the zone as a rushed zone and a difficult zone, having a short amount of time relative to the difficulties for exiting the autonomous vehicle 104.

At step 512, the autonomous vehicle 104 determines whether the classification of the zone is appropriate for dropping-off the passenger 102. In determining whether the classification of the zone is appropriate, the autonomous vehicle 104 may consider a wide variety of factors, including, but not limited to objects in the road, speed of objects, whether there is parking space available, whether there is a need to double park, whether an amount of time offered by the respective zone is enough for the passenger 102 to exit the autonomous vehicle 104, etc. In determining whether the amount of time offered by the respective zone is enough, the autonomous vehicle 104 may first determine the amount of time required for the passenger 102 to exit and/or unload the autonomous vehicle 104, and compare the respective amounts of time.

In determining the amount of time required for the passenger 102 to exit and/or unload the autonomous vehicle 104, the autonomous vehicle 104 may consider a wide variety of factors including, but not limited to, an average amount of time required for the passenger 102 to exit and/or unload the autonomous vehicle, preferences of the passenger 102, a classification of the pick-up and/or drop-off location retrieved from the map and/or the remote computing system 350 (e.g. a map database on the remote computing system 350 indicates that the pick-up location is by a grocery store and the drop-off location is in a residential area; therefore the autonomous vehicle 104 should allocate more time for the passenger 102 to exit because the passenger 102 may presumably need to unload groceries from the autonomous vehicle 104), number of passengers 102, a weight of cargo of the passenger 102, a number of luggage of the passenger 102, etc. Moreover, the autonomous vehicle 104 may further determine a projected amount of time for the passenger 102 to close a distance between the potential drop-off location 206 and a safe pedestrian zone (e.g. a sidewalk) based upon a wide variety of factors including, but not limited to, an average speed of the passenger 102 stored in the profile of the passenger, the distance between the potential drop-off location 106 and the safe pedestrian zone, information stored in the profile of the passenger 102, etc. The autonomous vehicle 104 may then add the projected amount of time to the amount of time required for the passenger 102 to exit and/or unload the autonomous vehicle 104 to calculate an estimated total amount of time for the passenger 102 to exit and/or unload the autonomous vehicle 104.

Thus, the autonomous vehicle 104 also measures the amount of time required for the passenger 102 to exit and/or unload the autonomous vehicle 104 against the classification of the potential drop-off location 206, such that if the amount of time offered by the classification of the potential drop-off location equates or exceeds the amount of time required for the passenger 102 to board or enter the autonomous vehicle 104 then the autonomous vehicle 104 determines that there is enough time for the passenger 102 to be dropped-off. Consequently, the drop-off location determination procedure proceeds to step 514.

If the amount of time offered by the classification of the potential drop-off location does not equate or exceed the amount of time required for the passenger 102 to exit and/or unload the autonomous vehicle 104, then the autonomous vehicle 104 determines that there is not enough time for the passenger 102 to be dropped-off and returns to step 506 to search for other potential drop-off locations 206.

It is understood that determining the amount of time required for the passenger 102 to exit and/or unload the autonomous vehicle 104 may occur at many different points in time for the drop-off location determination procedure 500. For example, determining the amount of time required for the passenger 102 to exit and/or unload the autonomous vehicle 104 may occur prior to step 502, 504, 506, 508, and/or 510.

At step 514, the autonomous vehicle 104 has identified potential drop-off location 206 as having an appropriately classified zone to drop-off the passenger 102. Thus, the autonomous vehicle 104 selects the potential drop-off location 206 as the designated drop-off location 208. Furthermore, the autonomous vehicle 104 notifies the passenger 102 of the designated drop-off location 208. The autonomous vehicle 104 may then be configured to request and receive confirmation of the selection of the designated drop-off location 208.

It is further contemplated that the autonomous vehicle 104 may also notify the passenger 102 of the classification of the zone of the designated drop-off location 208. For example, the autonomous vehicle 104 may select a rushed zone, which would have a shorter than average amount of time for the passenger 102 to exit the vehicle. Thus, the passenger 102 must exit the autonomous vehicle 104 more quickly. While some passengers 102 may have no problem quickly exiting, other passengers 102 may only want to exit quickly when they have prior notice. Similarly, some passengers 102 may hasten their exiting when they are notified of the classification of the designated drop-off location 208 as a rushed zone.

At step 516, the autonomous vehicle 104 receives a transmission from the passenger 102. The transmission may confirm selection of the designated drop-off location 208. The transmission may accept or reject the designated drop-off location 208. If the passenger 102 rejects the designated drop-off location 208, the autonomous vehicle 104 receives the transmission and returns to step 506 to search for other potential drop-off locations. For example, the autonomous vehicle 104 may have selected a rushed zone for the designated drop-off location 208, but the passenger 102 may want to have a relaxed or slower exiting pace. Thus, the passenger 102 may reject and/or deny confirmation of the designated drop-off location 208. If the passenger 102 accepts or confirms the designated drop-off location 208, the autonomous vehicle 104 receives the transmission and continues to step 518.

At step 518, the autonomous vehicle 104 arrives at the designated drop-off location 208 so that the passenger may exit and/or unload the autonomous vehicle 104.

It is further contemplated that the designated drop-off location 208 for one passenger may also be a potential pick-up location 106 for another passenger. In these scenarios, the autonomous vehicle 104 may also perform the same general series of steps. However, the amount of time for the second passenger to board the autonomous vehicle would be added to the amount of time for the first passenger 102 to exit and/or unload the autonomous vehicle 104.

It is also contemplated that the passenger 102 may have a short enough required amount of time for the passenger 102 to board and/or exit from the autonomous vehicle 104 that the autonomous vehicle 104 may not need to search for a permitted stopping area. Instead, a traffic lane may then be classified as an extremely rushed zone, such that the passenger 102 is allowed only a very short amount of time to enter and/or exit the autonomous vehicle 104. In other words, when a passenger 102 is capable of entering and/or exiting the autonomous vehicle 104 very quickly, the autonomous vehicle 104 may be adapted to double park to allow the passenger 102 to enter and/or exit the autonomous vehicle 104 very quickly. Similarly, there may be situations when the selected location is within a zone that the autonomous vehicle 104 is permitted to stop, but there are no available parking or stopping spaces. Thus, the autonomous vehicle 104 may classify the traffic lane as an extremely rushed zone, so that the autonomous vehicle 104 double parks when the passenger 102 is associated with a shorter average amount of time to enter or exit the autonomous vehicle 104.

Figure 6:
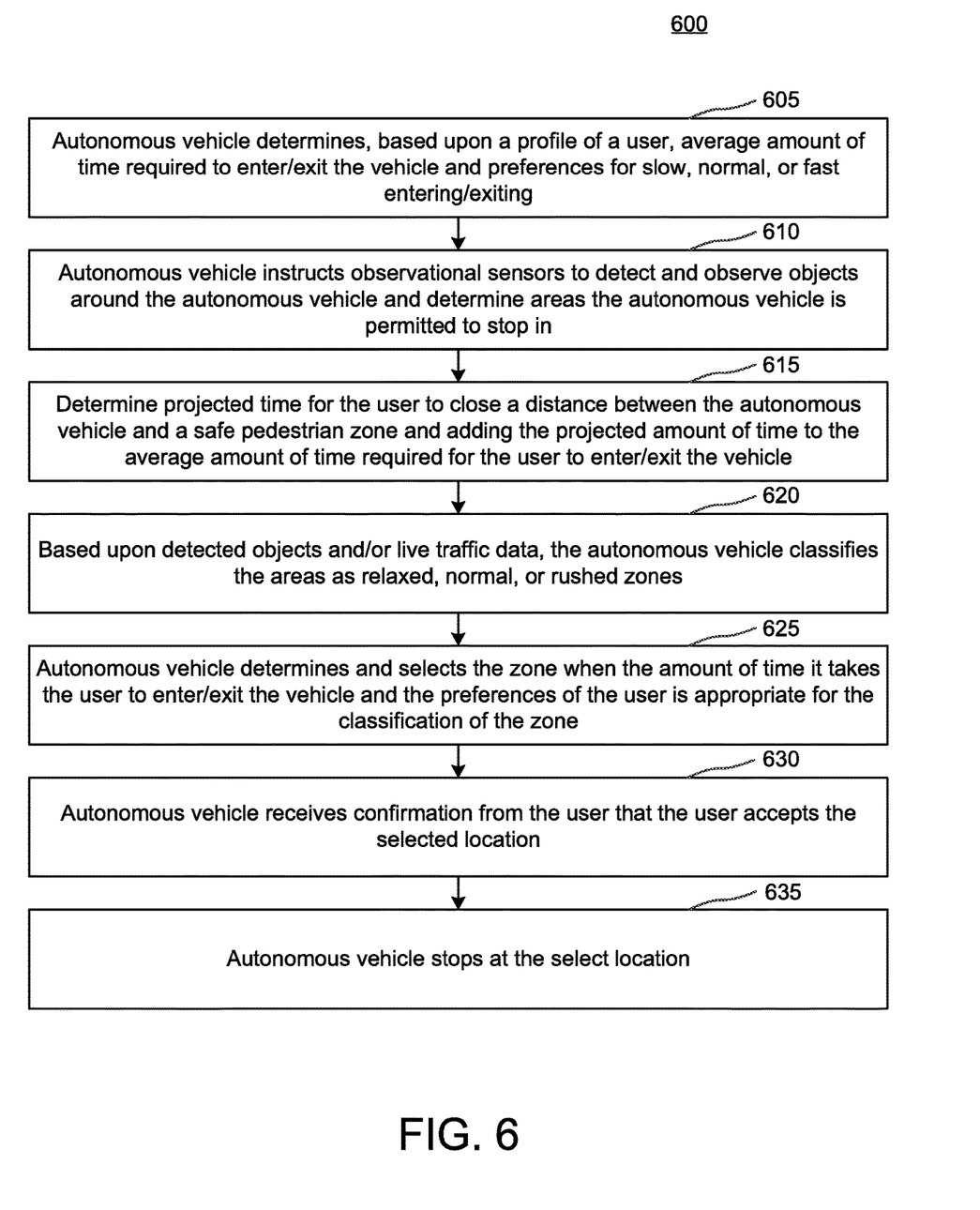
FIG. 6 illustrates an example sequence of steps for determining a designated location in accordance with some aspects of the present technology.

FIG. 6 illustrates a schematic block diagram of a location determination process 600 that the autonomous vehicle 104 may perform to determine pick-up and drop-off locations and optimize the pick-up and drop-off locations for characteristics of the passenger 102. While the location determination process 600 is largely the same for both picking up and dropping-off, different factors may be considered during picking up and dropping off. In other words, the location determination process 600 is a generalization of both the pick-up location determination procedure 400 and the drop-off location determination procedure 500.

In a pick-up situation, the autonomous vehicle first arrives near a general vicinity of the passenger 102 when the location determination process 600 starts at step 605.

In step 605, the autonomous vehicle 104 determines, based upon a profile of the passenger 102, an average amount of time required to enter the autonomous vehicle 104. More specifically, the average amount of time required for the passenger 102 to enter the autonomous vehicle 104 may be an attribute of the profile of the passenger 102. This average amount of time may either be computed and/or stored locally based on past ride data or computed and/or stored on the remote computing system 350. When the data is stored on the remote computing system 350, the remote computing system 350 can send the profile of the passenger 102 to the autonomous vehicle 104 when the passenger 102 requests a ride.

Also in step 605, the autonomous vehicle 104 further determines a preference set in the profile of the passenger 102. The preference may indicate a desire for a relaxed, normal, or rushed pick-up amount of time. It is further contemplated that the preference may be configured to indicate a desire for a relaxed, normal, or rushed pace or speed of entering the autonomous vehicle 104. In other words, the preference may be configured to indicate a preference in speed, a preference in time, or any other similar preference that assists the autonomous vehicle 104 in determining a suitable amount of time for pick-up. For example, if the passenger 102 further has guests along for the ride, the profile and/or a ride request sent by the passenger 102 may include an indicator or field noting the total number of passengers, which the autonomous vehicle 104 would understand to provide more time for more passengers so that more passengers can board the autonomous vehicle. Similarly, the sensor system 304-306 of the autonomous vehicle 104 may determine when there are more passengers for any given ride to provide more time for more passengers to exit from the autonomous vehicle 104. Furthermore, while preferences in the profile may authorize a rushed pick-up or drop-off procedure, the passenger 102 may also set a preference for any specific ride. In other words, the passenger can change their preference for pick-up or drop-off procedures in an as-needed basis. These preferences can be taken into account by both the remote computing system 350 or by the autonomous vehicle 104 in real-time determinations.

At step 610, the autonomous vehicle 104 instructs the sensor system 304-306 to detect and observe objects and surroundings around the autonomous vehicle 104. The autonomous vehicle 104 then uses data from the detected and observed objects around the autonomous vehicle 104 to determine potential pick-up locations 106 the autonomous vehicle 104 is permitted to stop in. The autonomous vehicle 104 may also communicate with the remote computing system 350 or other autonomous vehicles 104 to receive further data about potential pick-up locations 106 the autonomous vehicle 104 is permitted to stop in.

At step 615, the autonomous vehicle 104 determines a projected amount of time for the passenger 102 to close a distance between the autonomous vehicle 104 and a safe pedestrian zone. Then, the autonomous vehicle 104 adds the projected amount of time to the average amount of time required for the passenger 102 to enter/exit the autonomous vehicle 104. The projected amount of time for the passenger 102 to close a distance between the autonomous vehicle 104 and a safe pedestrian zone may be determined through a variety of different factors including, but not limited to, the distance itself, an average movement speed of the passenger 102, objects between the autonomous vehicle 104 and the safe pedestrian zone, hazards, etc. Additionally, the autonomous vehicle 104 may determine a location and/or a direction of the passenger 102 to further determine the variety of different factors through a position signal sent from a mobile device of the passenger, facial recognition from data interpreted by the sensor system 304-306, a distance to an entrance of a building from which the autonomous vehicle 104 is picking up or dropping-off the passenger to, a distance from the autonomous vehicle to a curb, etc.

At step 620, the autonomous vehicle 104 classifies the areas that the autonomous vehicle 104 is allowed to stop in. The classifications may provide information to the amount of time offered by the area. For example, the areas may be classified as relaxed, normal, or rushed zones.

At step 625, the autonomous vehicle 104 selects the zone when the amount of time it takes the passenger 102 to enter/exit the autonomous vehicle 104 and/or the preferences of the passenger 102 is appropriate for the classification of the zone. Additionally, the autonomous vehicle 104 may notify the passenger 102 of the selection of the zone. For example, the passenger 102 may set a preference for rushed or quick entering/exiting of the autonomous vehicle 104 to save time. Thus, the autonomous vehicle 104 may pick relaxed, normal, and/or rushed zones because these zones provide enough time for the passenger 102 to safely enter/exit the autonomous vehicle 104. Subsequently, the autonomous vehicle 104 may notify the passenger 102 of the selected zone for entering/exiting the autonomous vehicle 104.

At step 630, the autonomous vehicle 104 receives confirmation from the passenger 102 that the passenger accepts the selected zone or location.

At step 635, the autonomous vehicle stops at the selected zone or location and the location determination process 600 ends.

While aspects of the present technology have been described herein as taking place in a particular order, it will be understood that any order that has been explicitly suggested or implied was for clarity of explanation, and that these aspects can occur concurrently or in different orders. No limitation on the present technology should be imputed unless so described in the appending claims.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 7:
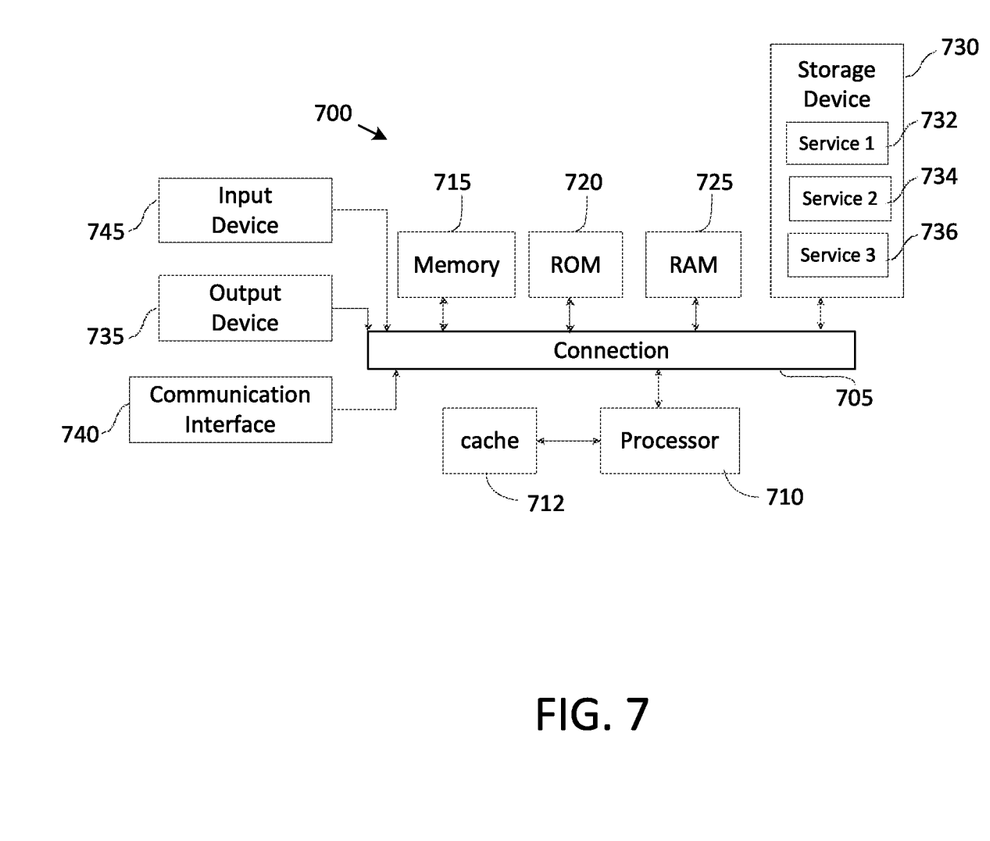
FIG. 7 shows an example of a system for implementing certain aspects of the present technology.

FIG. 7 shows an example of computing system 700, which can be for example any computing device making up internal computing system 310, remote computing system 350, (potential) passenger device executing rideshare app 370, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An autonomous vehicle comprising:
observational sensors configured to observe objects around the autonomous vehicle; and
a computing system that is in communication with the observational sensors, wherein the computing system comprises:
a processor; and
memory that stores computer-executable instructions that, when executed by the processor, cause the processor to:
determine, based upon a profile of a user, an average amount of time for the user to enter or exit the autonomous vehicle;
determine that the autonomous vehicle is near a destination;
determine an area near the destination that is within a zone that the autonomous vehicle is permitted to stop;
cause the observational sensors to detect and observe obstacles around the autonomous vehicle;
classify the zone into a category based on data collected by the observational sensors;
adjust the average amount of time for the user to enter or exit the autonomous vehicle based on a classification of the destination, a number of passengers in the autonomous vehicle, and a weight of cargo of the autonomous vehicle to determine an estimated amount of time for the user to enter or exit the autonomous vehicle;
compare the estimated amount of time for the user to enter or exit the autonomous vehicle with an offered amount of time for the category;
if the estimated amount of time for the user to enter or exit the autonomous vehicle is less than the offered amount of time for the category, determine, based upon detected objects around the autonomous vehicle and the estimated amount of time for the user to enter or exit the autonomous vehicle, a location within the zone to stop the autonomous vehicle to allow the user to enter or exit the autonomous vehicle; and receive confirmation from the user that the user accepts the location.

2. The autonomous vehicle of claim 1, wherein the instructions cause the processor to:

receive live traffic data from at least one other autonomous vehicle in an autonomous vehicle fleet indicating current traffic conditions, wherein the live traffic data is used along with the data interpreted from the observational sensors to classify the zone.

3. The autonomous vehicle of claim 2, wherein the instructions cause the processor to:

prohibit loading and unloading of the user in a rushed zone when the data interpreted from the observational sensors detects that the user is accompanied by luggage.

4. The autonomous vehicle of claim 2, wherein instructions cause the processor to:

determine a projected amount of time for the user to close a distance between the autonomous vehicle and a safe pedestrian zone, and add the projected amount of time to the estimated amount of time for the user to enter or exit the autonomous vehicle when selecting the location.

5. The autonomous vehicle of claim 1, wherein the estimated amount of time for the user to enter or exit the autonomous vehicle is further determined by a preference set by the user in the profile.

6. The autonomous vehicle of claim 1, wherein the instructions cause the processor to:

receive map data having predetermined stopping locations from a map database, wherein the map data is used to select the location.

7. The autonomous vehicle of claim 1, wherein the zone is classified into the category based on one or more environmental factors.

8. The autonomous vehicle of claim 1, wherein the zone is classified into the category based on one or more characteristics of the destination.

9. A non-transitory computer-readable medium comprising instructions that, when executed by one or more processors, cause the one or more processors to:

determine, based upon a profile of a user, an average amount of time for the user to enter or exit an autonomous vehicle;

determine that the autonomous vehicle is near a destination;

determine an area near the destination that is within a zone that the autonomous vehicle is permitted to stop;

cause observational sensors to detect and observe obstacles around the autonomous vehicle;

classify the zone into a category based on data collected by the observational sensors;

adjust the average amount of time for the user to enter or exit the autonomous vehicle based on a classification of the destination, a number of passengers in the autonomous vehicle, and a weight of cargo of the autonomous vehicle to determine an estimated amount of time for the user to enter or exit the autonomous vehicle;

compare the estimated amount of time for the user to enter or exit the autonomous vehicle with an offered amount of time for the category;

if the estimated amount of time for the user to enter or exit the autonomous vehicle is less than the offered amount of time for the category, determine, based upon detected objects around the autonomous vehicle and the estimated amount of time for the user to enter or exit the autonomous vehicle, a location within the zone to stop the autonomous vehicle to allow the user to enter or exit the autonomous vehicle; and receive confirmation from the user that the user accepts the location.

10. The non-transitory computer-readable medium of claim 9, wherein the instructions further cause the one or more processors to receive live traffic data from at least one other autonomous vehicle in an autonomous vehicle fleet, wherein the zone is classified based on the live traffic data.

11. The non-transitory computer-readable medium of claim 9, wherein the instructions further cause the one or more processors to:

determine a projected amount of time for the user to close a distance between the autonomous vehicle and a pedestrian zone; and add the projected amount of time to the estimated amount of time for the user to enter or exit the autonomous vehicle for an estimated total amount of time, wherein the location to stop the autonomous vehicle is further determined based upon the estimated total amount of time.

12. The non-transitory computer-readable medium of claim 9, wherein the location is determined based upon a preference set by the user in the profile.

13. The non-transitory computer-readable medium of claim 9, wherein the zone is classified into the category based on one or more environmental factors.

14. The non-transitory computer-readable medium of claim 9, wherein the zone is classified into the category based on one or more characteristics of the destination.

15. A method comprising:

determining, based upon a profile of a user, an average amount of time for a user to enter or exit an autonomous vehicle;

determining that the autonomous vehicle is near a destination;

determining an area near the destination that is within a zone that the autonomous vehicle is permitted to stop;

causing observational sensors of the autonomous vehicle to detect and observe objects around the autonomous vehicle;

classifying the zone into a category based on data collected by the observational sensors;

adjusting the average amount of time for the user to enter or exit the autonomous vehicle based on a classification of the destination, a number of passengers in the autonomous vehicle, and a weight of cargo of the autonomous vehicle to determine an estimated amount of time for the user to enter or exit the autonomous vehicle;

comparing the estimated amount of time for the user to enter or exit the autonomous vehicle with an offered amount of time for the category;

if the estimated amount of time for the user to enter or exit the autonomous vehicle is less than the offered amount of time for the category, determining, based upon the comparison, a location within the zone to stop the autonomous vehicle to allow the user to enter or exit the autonomous vehicle; and receiving confirmation from the user that the user accepts the location.

16. The method of claim 15, further comprising:

receiving live traffic data from at least one other autonomous vehicle in an autonomous vehicle fleet indicating current traffic conditions, wherein classifying of the zone is further based on the live traffic data.

17. The method of claim 15, further comprising:
determining a projected amount of time for the user to close a distance between the autonomous vehicle and a pedestrian zone; and
adding the projected amount of time to the estimated amount of time for the user to enter or exit the autonomous vehicle for an estimated total amount of time, wherein determining the location to stop the autonomous vehicle is further based upon the estimated total amount of time.

18. The method of claim 15, wherein the estimated amount of time for the user to enter or exit the autonomous vehicle is further based upon previous amounts of time the user used to enter or exit the autonomous vehicle during previous trips.

19. The method of claim 15, wherein the location is determined based upon map data having predetermined stopping locations.

20. The method of claim 15, wherein the zone is classified into the category based on at least one of one or more environmental factors and one or more characteristics of the destination.

\* \* \* \* \*